Figure 1:
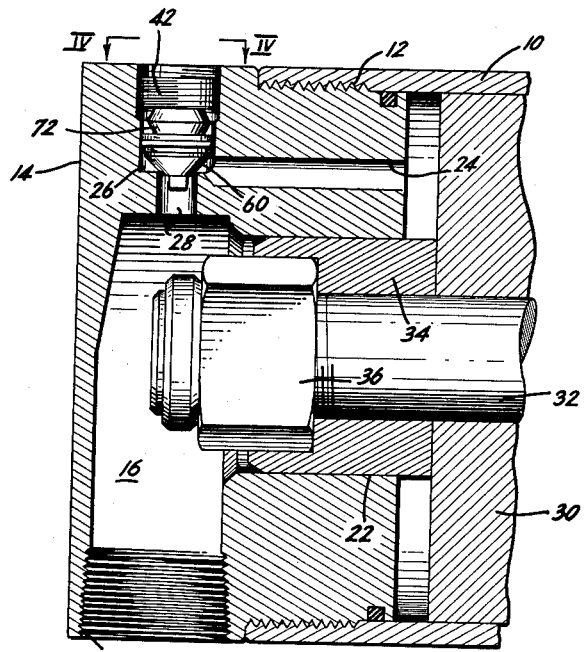

INVENTOR
RAYMOND H. MAURER
BY Beaman & Beaman
ATTORNEYS

July 27, 1965

R. H. MAURER 3,196,753

CUSHION CONTROL AND SURGE RELIEF

Filed May 21, 1963

2 Sheets-Sheet 2

INVENTOR
RAYMOND H. MAURER
BY Beaman & Beaman
ATTORNEYS

United States Patent Office 3,196,753
Patented July 27, 1965

3,196,753
CUSHION CONTROL AND SURGE RELIEF
Raymond H. Maurer, Jackson, Mich., assignor to The Tomkins-Johnson Co., Jackson, Mich., a corporation of Michigan
Filed May 21, 1963, Ser. No. 282,080
12 Claims. (Cl. 91—26)

The invention pertains to control devices for expansible chamber motors, and particularly relates to expansible chamber motors having means cushioning the piston movement as the piston nears the end of its stroke.

Cushioning structure for expansible chamber motors employing both gases and liquids as the pressurized medium is well known. Such structure normally restricts the escape of the exhaust fluid from the exhaust side of the moving motor piston as the piston nears the end of the cylinder toward which it is moving. A conventional type of cushioning structure includes a valve plug mounted on the piston which sealingly engages with an orifice defined in a motor head through which the exhaust fluid is passing. The longitudinal dimension of the valve plug determines the position of the piston at which cushioning takes place. It is the general practice to bleed the pressurized medium from the exhaust side of the piston trapped between the head and the piston after the valve plug has closed the exhaust port. It is the fluid so trapped which produces the cushioning action, and by bleeding the pressurized medium from the exhaust side of the piston at a controlled rate the deceleration of the final movements of the piston toward the head may be accurately regulated. An example of this type of cushioning structure is shown in United States Patent No. 2,804,052.

While the above described cushioning structure performs satisfactorily in many applications, problems are encountered in some high pressure and some large capacity, expansible motors employing hydraulic liquids as a pressure medium. In some applications employing hydraulic liquids wherein a high piston velocity is required, a "hammering" or "shock" will be experienced when the piston valve plug closes the exhaust port. Such "hammering" is due to the rebound reaction from the initial shock which creates a vacuum or cavitation causing the piston to strike back against the fluid due to the vacuum. Thus, as the bleed means is not sufficient to dissipate the instantaneous high pressures built up between the piston and the head, violent forces are imposed on the piston causing undesirable vibrations, noise and strain on the expansible chamber motor appaartus. It is an object of the invention to provide cushion control and surge relief means for use with expansible chamber motors having cushioning structure, wherein "hammering" and similar undesirable effects, due to instantaneously occurring high pressures between the piston and cylinder head through which the hydraulic liquid is being exhausted, are eliminated.

Another object of the invention is to provide expansible chamber motor cushion control and surge relief means, wherein means are provided for momentarily compensating for excessive cushioning resistance pressures, wherein such means do not adversely affect the normal operation of the cushioning and bleed valving, and wherein such means may be economically manufactured and are readily employable with conventional expansible chamber motor structure.

A further object of the invention is to provide a cushion control and surge relief for expansible chamber motors, wherein the cushion control and surge relief means are combined with the cushion bleed valve, and wherein the bleed valve constitutes a portion of the surge relief means.

Yet another object of the invention is to provide a cushion control and variable surge relief for expansible chamber motors, wherein such apparatus includes the bleed valve for the cushioning control, and wherein both the bleed valve position and the characteristics of the surge relief may be independently regulated.

Figure 2:
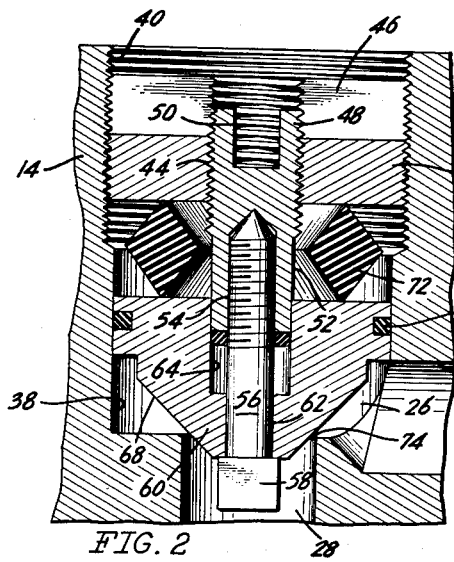
Figure 3:
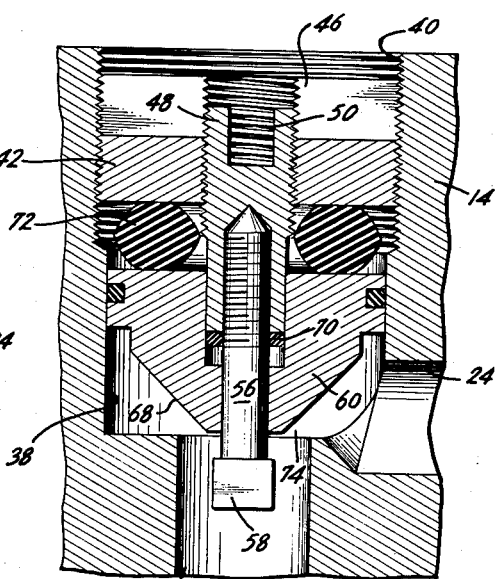
Figure 4:
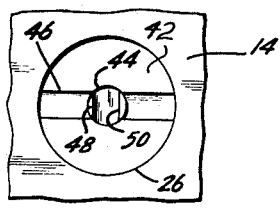
Figure 5:
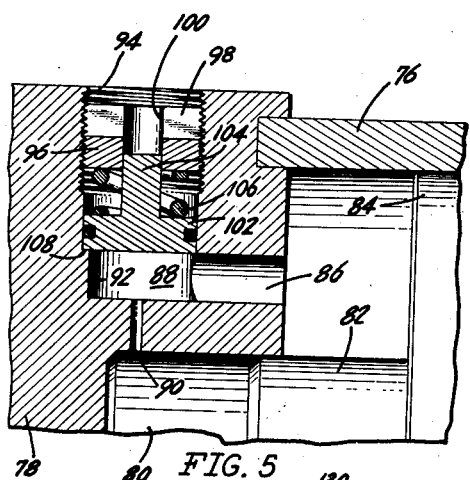
Figure 6:
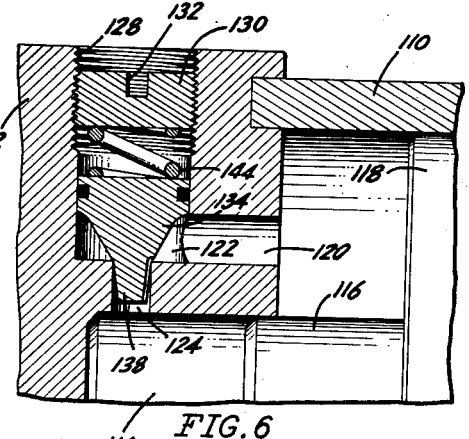
Figure 7:
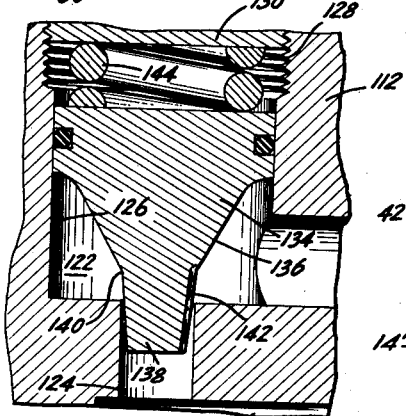
Figure 8:
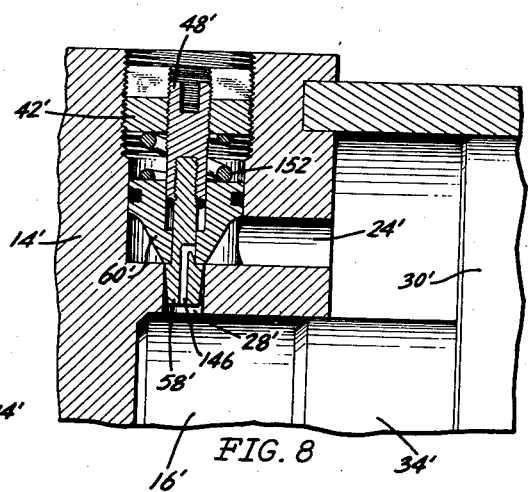
Figure 9:
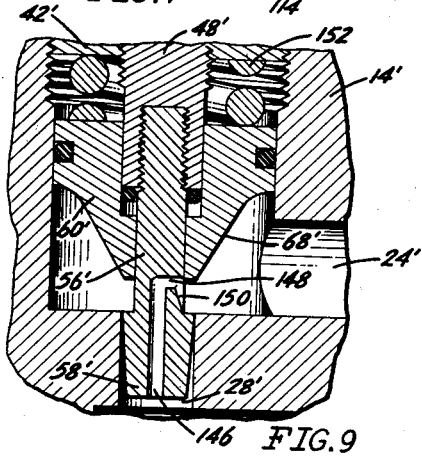

These and other objects of the invention arising from the structural relationships of components of embodiments thereof will be apparent from the following description and accompanying drawings wherein:

FIG. 1 is a diametrical, sectional, elevational, detail view of the components of an expansible chamber motor employing the invention, illustrating the cushion control and surge relief means in nonsectional form, FIG. 2 is an enlarged, elevational, sectional view of the cushion control and surge relief structure of FIG. 1, illustrating the components in the normal operating position, FIG. 3 is an elevational, sectional view similar to FIG. 2, illustrating the structure in the surge-relieving position, FIG. 4 is a plan, detail, enlarged view of the cushion control and surge relief structure, as taken along section IV—IV of FIG. 1, FIG. 5 is a detail, sectional, elevational view of another embodiment of surge relief means, illustrating the apparatus in the normal position, FIG. 6 is an elevational, sectional, detail view of another embodiment of the invention, wherein the cushion control and surge relief means are not independently adjustable, and are illustrated in the normal position, FIG. 7 is an enlarged, detail, elevational view of the embodiment of FIG. 6, illustrating the structure in the surge-relieving position, FIG. 8 is an elevational, detail, sectional view of another embodiment of the invention, wherein the cushion control valving and surge relief apparatus may be independently adjusted, and FIG. 9 is an enlarged, detail, sectional elevational view of the apparatus of FIG. 8, illustrating the surge relief means in a surge-relieving position.

The environment in which the invention is employed will be appreciated from FIG. 1, wherein the end of a typical expansible chamber motor employing the invention is illustrated. The expansible chamber motor includes a cylinder 10 being internally threaded at 12 adjacent its end, whereby the head 14 may be threadedly affixed to the end of the cylinder enclosing the cylinder end. A port 16 is defined within the head 14 having a threaded opening 18 whereby conduit means may be affixed to the head in communication with the port. The port 16 also includes a cylindrical orifice 22 coaxially related to the cylinder 10 and extending from the port through the head to communicate with the interior of the cylinder. A by-pass passage 24 is defined within the head 14 communicating at one end with the interior of the cylinder, and communicating at the other end with a chamber 26 defined in the head. A radial passage 28 interconnects the chamber 26 with the port 16.

The expansible chamber motor also includes a piston 30 slideably received within the cylinder 10 and mounted on a piston rod 32. A valve plug 34 is also affixed to the piston rod 32 by a nut 36 threaded on the end of the piston rod. The valve plug 34 is of a cylindrical configuration and adapted to be closely received within the port orifice 22.

The above described structure is of a conventional nature, and bleed valve means is located within the chamber 26 to control the flow of fluid through the by-pass passage 24 into the port 16 after the valve plug 34 has been received within the port orifice 22. The above described structure is conventional and the basic relationships are shown in the assignee's United States Patent No. 2,804,052.

As the piston 30 approaches the head 14 during piston movement, the fluid between the piston 30 and the head 14 will be exhausting through the port orifice 22 into port 16 and through the conduit attached to the threaded port opening 18. When the piston nears the head, the leading end of the valve plug 34 will be received within the port orifice 22 preventing further exhausting of fluid through the port orifice 22. The fluid between the piston 30 and the head 14 is then compressed, producing a cushioning pressure, and the fluid trapped between the piston 30 and head 14 is bled into the port 16 past the bleed valve within chamber 26 at the rate determined by the valve position.

In the embodiments of FIGS. 1 through 4 and 6 through 9 the cushion control and surge relief apparatus, to which the invention is directed, is located within the chamber 26 normally occupied by the conventional bleed valve. As will be apparent from FIGS. 1, 2, and 3, the chamber 26 includes a cylindrical, smooth wall portion 38 intersected by the passage 24. The passage 28 is coaxially related to the chamber portion 38. The chamber 26 is threaded at 40 between the exterior of the head 14 and the cylindrical, smooth wall portion 38.

The cushion control and surge relief assembly includes a cylindrical screw member 42 exteriorly threaded to cooperate with the threads 40 of the chamber 26, and provided with an interior concentric threaded bore 44. A diametrically related slot 46 is formed in the upper portion of the screw member 42, as will be apparent from FIG. 4. A threaded stem 48 is threadedly received within the bore 44, and is provided with a diametrical slot 50 at its outer end, whereby the stem may be rotated and axially adjusted relative to the screw member 42. The lower end of the stem 48 is externally provided with a cylindrical surface 52, and is internally provided with a coaxial, blind, threaded bore 54 for receiving a threaded stud 56 having an enlarged head 58 at its innermost end.

A valve element 60 is slideably supported on the stud 56 and the stem 48. The valve element 60 is provided with a small, cylindrical bore 62 which slideably engages the stud 56, and an enlarged, cylindrical bore 64 slideably engages the cylindrical, exterior surface 52 of the stem 48. The outer periphery of the valve element 60 is of a cylindrical configuration slideably cooperating with the chamber wall portion 38, and an annular sealing ring 66 seals the valve element with respect to the chamber wall. The lower portion of the valve element includes a conical surface 68 having a minimum diameter less than the diameter of the radial passage 28, whereby the lower end of the valve element may project into the passage 28, as shown in FIGS. 1 and 2. An annular sealing ring 70 is preferably employed within the bore 64 about stud 56 to prevent the flow of fluid past the stem 48. Resilient spring means are interposed between the screw 42 and the valve element 60 to normally maintain the valve element in engagement with the stud head 58. In the embodiment of FIGS. 1 through 4, the spring means is illustrated as comprising an annular, elastomer element 72 of a normal diamond cross-sectional configuration. This type of spring is capable of producing high biasing forces in a relatively limited space and is, therefore, suitable for use with the invention. It will be appreciated that the elastomer element 72 may be replaced with any conventional spring-biasing means such as the compression coil springs of the embodiments of FIGS. 5 through 9.

It will be appreciated from the foregoing description that the cushion control and surge relief assembly may be preassembled before insertion into the chamber 26. The assembly consists of the screw 24, stem 48, stud 56, valve element 60, and spring means 72. The relative spacing between the screw 24 and the valve element 60 is determined by the axial position of the stem 48 within the screw. By inserting a screwdriver-like tool into the slot 50, the stem 48 may be rotated to position the valve element relative to the screw. The cushion control and surge relief assembly is inserted into the chamber 26, and by the use of another screwdriver-like tool received within the slot 46, the entire assembly may be screwed into the chamber and positioned therein as desired. When threading the assembly into chamber 26, it is preferred that the tool received within slot 46 also include means which are received within slot 50, whereby rotation of the assembly will not cause inadvertent rotation of the stem 48 relative to screw 42. The assembly is positioned within the chamber in such a way that the valve element surface 68 forms an annular orifice 74 with the edge of the passage 28 where it intersects the chamber 26. Thus, the annular orifice 74 constitutes the control orifice to determine the rate at which the fluid will be exhausted through the passages 24 and 28. The effective cross-sectional area of the orifice 74 may be very accurately regulated by rotating the entire assembly through screw 42. The normal operating condition of the apparatus is that shown in FIG. 2, wherein the orifice 74 will be of a relatively restricted nature and limit the fluid flow through the passages 24 and 28 to provide deceleration of the piston during its final movements as it approaches head 14.

To prevent "hammering," due to the very high cushioning pressure instantaneously occurring between the piston 30 and the head 14 at the beginning of the cushioning operation when valve plug 34 first closes orifice 22, the volume of the space subjected to the cushioning fluid pressure may be temporarily increased by the lifting of the valve element 60 within the chamber 26. The raising of the valve element 60, as illustrated in FIG. 3, occurs automatically due to the fluid pressures imposed on the valve element surface 68 and the lower surfaces of the valve element. The valve element 60 thus functions as a piston causing the elastomer spring 72 to be compressed and thereby absorbing the initial "shock" of the cushioning pressure. In addition to instantaneously increasing the expansible chamber capacity subjected to the cushioning pressure, the outward radial movement of the valve element 60 increases the flow capacity into the passage 28, thereby permitting the cushioning pressure to be very rapidly dissipated during the initial stages of cushioning. Due to the conical configuration of the valve surface 68, the greater the movement of valve element 60 the greater will be the area of the orifice 74.

It will be appreciated that the raising of the valve element 60 to the position of FIG. 3 occurs only at the time of the very high fluid pressures produced at the initial stage of cushioning. As the elastomer element 72 imposes a considerable biasing force on the valve element, the valve element will assume the position of FIG. 2 after the initial cushioning pressure occurs, and the majority of the fluid passing through the passages 24 and 28 will be at the predetermined flow rate. Therefore, it will be appreciated that the invention provides a surge relief and a variable flow rate through the bleed passages 24 and 28 which effectively prevent the occurrence of excessive cushioning pressures and the attendant deleterious effects.

As described above, the normal bleeding rate through orifice 74 is adjusted by the position of screw 42 within chamber 26. The operating characteristics of the valve element 60 during absorption of the high initial cushioning pressure may be adjustably regulated, within limits, by rotating the stem 48 within screw 42 to vary the "at rest" biasing force imposed on the valve element 60. It will be appreciated that when stem 48 is adjusted within screw 42, further adjustment of screw 42 within chamber 26 will be necessary to maintain a given cross-sectional flow area at orifice 74.

The embodiment of FIG. 5 illustrates a cylinder 76 having a head 78 affixed thereto. A port 80 is defined within the head 78, and is adapated to receive the valve plug 82 attached to the piston 84. Bleed passage 86 communicates with a chamber 88 and the interior of cylinder 76, and orifice 90 of restricted configuration establishes communication between the chamber 88 and the port 80. The chamber 88 is provided with a cylindrical, smooth wall portion 92 and a threaded portion 94. A screw 96 is adjustably located within the threaded portion of the chamber 88, and is provided with a diametrical slot 98 and a concentric bore 100. A piston member 102 is slideably located within the smooth wall portion 92, and is guided within the screw 96 by the stem 104 cooperating with the bore 100. A coil spring 106 is imposed between the screw 96 and the piston 102 biasing the piston toward the annular shoulder 108 defined within the cylindrical chamber portion 92.

The embodiment of FIG. 5 provides surge relief at the beginning of the cushioning operation by permitting the high fluid pressures occurring at the beginning of cushioning to bias the piston 102 toward the screw 96, thereby permitting spring 106 to absorb the high cushioning pressures. After the high initial fluid pressure has occurred, the spring 106 will again bias the piston 102 to the position shown in FIG. 5 against the shoulder 108.

In the embodiment of FIG. 5, the rate of bleeding during cushioning will be determined by the diameter of the orifice 90. If desired, the surge control structure of FIG. 5 may be employed with conventional needle valve control bleed-off means defined in the head. Such conventional needle valve means may be similar to that shown in United States Patent No. 2,804,052.

The embodiments of FIGS. 6 and 7 illustrate a cushion control and surge relief wherein the rate of bleeding of the cushioning pressure during normal operation of the bleeding is determined by the size of a machined slot defined in the valve element. In FIG. 6 a cylinder 110 is sealed at its end by a head 112. A port 114 is defined within the head 112, having an orifice which cooperates with the valve plug 116 mounted on piston 118 to produce the cushioning effect. Bleed passage 120 establishes communication between the cylinder 110 and the chamber 122. Orifice 124 establishes communication between the chamber 122 and the port 114. The chamber 122 is provided with a cylindrical, smooth wall portion 126 and is threaded at 128. A screw 130, having a screwdriver-receiving slot 132 defined therein, threads into the chamber portion 128. A valve element 134 sealingly engages the chamber smooth wall 126, and includes a conical surface 136 terminating in a conical tip 138. A shoulder 140 is defined at the intersection of the tip 138 and the surface 136, and a slot 142 is machined in the exterior surface of the tip, extending slightly above the shoulder 140. A coil spring 144 is interposed between the screw 130 and the valve element 134 to maintain the valve element in the normal position of FIG. 6, wherein the shoulder 140 engages the upper end of the orifice 124. Therefore, it will be appreciated that during the normal bleeding operation, fluid will pass through the bleed passage 120 and into the orifice 124 through the slot 142. Upon the occurrence of an excessive cushion pressure between the piston 118 and the head 112, the valve element 134 will rise, as shown in FIG. 7, to increase the volume of the space subjected to the excessive cushioning pressure and also to increase the bleed flow into the orifice 124. Increasing of the bleed flow occurs, due to the conical configuration of the tip 138, whereby withdrawal of the tip from the orifice 124 increases the clearance between the tip and the upper edge of the orifice 124.

In the embodiment of FIGS. 8 and 9, the arrangement is quite similar to the embodiment shown in FIGS. 1, 2, and 3, and similar components are indicated by primed reference numerals. In the embodiment of FIGS. 8 and 9, the stud 56′ is provided with an axial bore 146 terminating in an upwardly, radially extending passage 148, which cooperates with a slot 150 of gradually decreasing area as the slot extends toward head 58′. As the valve element 60′ engages the head of the stud 56′, it will be apparent, as shown in FIG. 8, that the passage 148 will be closed by the valve element during the normal bleeding operation. The head 58′ of the stud is of a conical exterior configuration whereby the normal bleed orifice is defined by the spacing between the head 58′ and the passage 28′, whereby an annular orifice is produced which may be varied in size by axially positioning the stud within the passage 28′ by means of usually rotating the screw 42′. A coil compression spring 152 is interposed between the screw 42′ and the valve element 60′ to bias the valve element into normal engagement with the head 58′ of the stud.

When an excessive cushioning pressure occurs within the passage 24′, the fluid pressure will lift the valve element 60′ from the head of the stud 56, as shown in FIG. 9, and permit the fluid to bleed into the port 16′. Due to the configuration of the bleed slot 150, the higher the valve element 60′ is lifted from the stud head 58′, the greater will be the volume of fluid flowing through the passage 146.

It will be appreciated, therefore, that the cushion control and surge relief of the various embodiments of the invention are capable of dampening and preventing excessive vibrations and noises due to high, initial cushioning pressures by providing means to resiliently absorb the shock produced by the high, initial cushioning pressures, and also permit the cushioned fluid to be bled from the cushioned space at a greater rate than normal to aid in the dissipation of the high fluid pressure.

It is to be understood that various modifications to the disclosed embodiments may be apparent to those skilled in the art without departing from the spirit and scope thereof, and it is intended that the invention be defined only by the scope of the following claims.

I claim:

1. In an expansible chamber motor including a cylinder having a head enclosing an end thereof, a piston slideably and operably located within said cylinder, a port defined in said head normally directly communicating with the interior of said cylinder, cooperable valve means defined on said head and piston adapted to close said port from direct communication with said cylinder at a predetermined position of said piston relative to said head, a bleed passage defined in said head communicating with the interior of said cylinder adjacent said head and said port, a regulating valve within said passage regulating the flow therethrough, and surge relief means associated with said valve responsive to the pressure within said cylinder adjacent said head actuating said valve in proportion to said pressure.

2. In an expansible chamber motor including a cylinder having a head enclosing an end thereof, a piston slideably and operably located within said cylinder, a port defined in said head normally directly communicating with the interior of said cylinder, cooperable valve means defined on said head and piston adapted to close said port from direct communication with said cylinder at a predetermined position of said piston relative to said head, a bleed passage defined in said head communicating with the interior of said cylinder adjacent said head, a regulating valve within said passage regulating the flow therethrough, said valve including a support means adapted to be adjustably positioned within said head, a valve head support carried by said support means, a valve head movably supported on said valve head support having a side exposed to the passage pressure and a nonpressure side, biasing means biasing said valve head to a normal operative position and an orifice included in said passage, said valve head passage pressure exposed side cooperating with said orifice forming an adjustable restricting opening within said passage whereby when the pressure within said passage exceeds the biasing force of said biasing means, said valve head is displaced away from said orifice increasing the area of said restricting opening.

3. In an expansible chamber motor including a cylinder having a head enclosing an end thereof, a piston slideably and operably located within said cylinder, a port defined in said head normally directly communicating with the interior of said cylinder, cooperable valve means defined on said head and piston adapted to close said port from direct communication with said cylinder at a predetermined position of said piston relative to said head, a bleed passage defined in said head communicating with the interior of said cylinder adjacent said head and said port, cushion control and surge relief means within said passage regulating the flow therethrough, said means including a threaded support body, a threaded bore defined in said body adjacent said passage threadedly receiving said support body, a valve element support rod adjustably threadedly carried by said support body, a valve element slideably mounted on said support rod having a side exposed to the passage pressure and a nonpressure side, a shoulder defined on said rod, biasing means interposed between said support body and said valve element biasing said valve element toward said shoulder for normal engagement therewith, an orifice included in said passage, said valve element passage pressure exposed side cooperating with said orifice forming an adjustable restricting opening with said passage, said valve element adapted to be forced away from said orifice upon the pressure within said passage becoming sufficient to overcome said biasing means.

4. In an expansible motor having a cylinder, a head enclosing one end of the cylinder a piston slideably supported within said cylinder, piston cushioning apparatus employed with said motor including a bleed passage defined in said head communicating with the interior of said cylinder, said passage including an orifice defined therein, a regulating valve mounted in said head cooperating with said orifice regulating flow through said passage, said valve including a support body supported by said head in predetermined relation to said orifice, a valve element support rod carried by said support body, a valve element movably mounted on said support rod, positioning means defined on said rod positioning said valve element thereon, said valve element having a pressure face subjected to the pressure within said passage and an opposite nonpressure face sealed with respect to the passage pressure, said valve element cooperating with said orifice forming a restriction in said passage, biasing means biasing said valve element toward said orifice and against said positioning means, said valve element adapted to move away from said orifice against the force of said biasing means upon the pressure exerted on said pressure side overcoming the force of said biasing means.

5. In an expansible motor, as in claim 4, wherein said biasing means consists of a spring interposed between said valve element and said support body.

6. In an expansible motor, as in claim 4, wherein said biasing means consists of an elastomer compression spring.

7. In an expansible motor having a cylinder, a head enclosing one end of the cylinder and a piston slideably supported within said cylinder, piston cushioning apparatus employed with said motor including a bleed passage defined in said head communicating with the interior of said cylinder, said passage including an orifice defined therein, a bore defined in said head intersecting said passage adjacent said orifice, cushion control and surge relief means mounted within said bore cooperating with said orifice regulating flow through said passage, said means including a support body adjustably positionable within said bore, a valve element support rod carried by said support body extending toward said orifice, a valve element movably mounted on said support rod and sealingly and slideably associated with said bore, positioning means defined on said rod positioning said valve element thereon, said valve element having a pressure face subjected to the pressure within said passage and an opposite nonpressure face, said valve element cooperating with said orifice forming a restriction in said passage, biasing means biasing said valve element toward said orifice and against said positioning means, said valve element adapted to move away from said orifice against the force of said biasing means upon the pressure exerted on said pressure side overcoming the force of said biasing means.

8. In an expansible motor, as in claim 7, wherein said bore is partially threaded at a location remote from said oridfice, and said support body is threaded for cooperation with said bore threads.

9. In an expansible motor, as in claim 7, wherein said biasing means comprises a spring interposed between said support body and said valve element.

10. In an expansible motor, as in claim 9, wherein said spring is formed of an elastomer material.

11. In an expansible motor, as in claim 7, wherein said support rod is threadedly connected to said support body whereby said positioning means may be adjusted relative to said support body.

12. An expansible chamber motor comprising, in combination, a cylinder, a piston structure slideably mounted within said cylinder, a head enclosing an end of said cylinder, a port defined in said head normally directly communicating with the interior of said cylinder, means actuated by said piston structure adapted to close said port with respect to communication with the cylinder interior upon said piston structure approaching said head, a surge relief cylinder defined in said head communicating with said cylinder adjacent said head, a surge relief piston slideably mounted within said surge relief cylinder having a pressure face exposed to fluid within said surge relief cylinder, compression spring means bearing against said surge relief piston in opposed relation to said pressure face, a bleed passage defined in said head communicating with said cylinder and said port whereby restricted communication between said cylinder and said port will be maintained upon closing said port relative to the cylinder interior, said surge relief cylinder constituting a portion of said bleed passage, an orifice defined in said bleed passage, and valve means defined on said surge relief piston cooperating with said orifice regulating fluid flow therethrough and through said bleed passage.

References Cited by the Examiner

UNITED STATES PATENTS

| | | | |
|---|---|---|---|
| 1,871,958 | 8/32 | Chryst | 137—513.5 X |
| 2,786,452 | 3/57 | Tucker | 91—407 X |
| 2,804,052 | 8/57 | Halladay et al. | 91—26 |
| 2,833,312 | 5/58 | Flick | 91—26 |

FOREIGN PATENTS

| | | |
|---|---|---|
| 1,045,365 | 6/53 | France. |

FRED E. ENGELTHALER, *Primary Examiner.*

SAMUEL LEVINE, *Examiner.*